(12) United States Patent
Tran

(10) Patent No.: US 7,743,381 B1
(45) Date of Patent: Jun. 22, 2010

(54) CHECKPOINT SERVICE

(75) Inventor: Cuong H. Tran, Los Altos, CA (US)

(73) Assignee: Symantec Operating Corporation, Mountain View, CA (US)

( * ) Notice: Subject to any disclaimer, the term of this patent is extended or adjusted under 35 U.S.C. 154(b) by 2044 days.

(21) Appl. No.: 10/663,632

(22) Filed: Sep. 16, 2003

(51) Int. Cl.
   G06F 9/46      (2006.01)
   G06F 11/00     (2006.01)
   G06F 12/00     (2006.01)

(52) U.S. Cl. .................... 718/106; 714/15; 707/202

(58) Field of Classification Search ...... 718/1, 718/106; 714/15; 707/202
   See application file for complete search history.

(56) References Cited

U.S. PATENT DOCUMENTS

| | | | |
|---|---|---|---|
| 5,963,959 A * | 10/1999 | Sun et al. ............. | 707/200 |
| 6,360,331 B2 * | 3/2002 | Vert et al. ............ | 714/4 |
| 6,795,966 B1 * | 9/2004 | Lim et al. ............ | 718/1 |
| 6,823,474 B2 | 11/2004 | Kampe et al. | |
| 7,325,046 B1 * | 1/2008 | Novaes et al. ......... | 709/220 |
| 2003/0037178 A1 * | 2/2003 | Vessey et al. ......... | 709/319 |
| 2004/0049573 A1 * | 3/2004 | Olmstead et al. ...... | 709/224 |

OTHER PUBLICATIONS

Veritas Software Corporation, "Basics of Failover Management in Application Clustering Packages," Jul. 7, 2003, 15 pages.

Service Availability Forum, "Service Availability™ Forum Application Interface Specification," Apr. 12, 2003, 50 pages.

Cooper, "Replicated Distributed Programs," Proceedings of the $10^{th}$ ACM Symposium on Operating Systems Principles, Dec. 1985, pp. 63-78.

Birman, "Replication and Fault-Tolerance in the ISIS System," Proceedings of the $10^{th}$ ACM Symposium on Operating Systems Principles, Dec. 1985, pp. 79-86.

BEA, "BEA WebLogic Server™; Using WebLogic Server Clusters," BEA WebLogic Server Version 6.1, Jun. 24, 2002, 145 pages.

* cited by examiner

*Primary Examiner*—Meng-Ai An
*Assistant Examiner*—Camquy Truong
(74) *Attorney, Agent, or Firm*—Lawrence J. Merkel; Meyertons, Hood, Kivlin, Kowert & Goetzel, P.C.

(57) ABSTRACT

A computer accessible medium may be encoded with instructions which, when executed: replicate a checkpoint segment from a first local storage of a first node to at least one other node; and load a copy of the checkpoint segment from the other node to a second local storage of a second node. The checkpoint segment is stored into the first local storage by an application, and comprises a state of the application. The copy of the checkpoint segment is loaded into a second local storage responsive to a request from the second node to load the copy. The second node is to execute the application. In some embodiments, the copy of the checkpoint segment may also be loaded into a global storage.

28 Claims, 5 Drawing Sheets

CHECKPOINT SERVICE

BACKGROUND OF THE INVENTION

1. Field of the Invention

This invention is related to providing checkpoint services for applications in a cluster of servers.

2. Description of the Related Art

Clusters of computer systems ("nodes") are often used to provide scalability and high availability for various applications. For high availability, an application may be "failed over" from a first node on which it was executing to a second node. The failover may occur due to a hardware or software problem on the first node, for example. The first node may "crash", or the application may crash on the first node. Additionally, similar mechanisms to the failover may be used to move an executing application from a first node to a second node for performance reasons. For example, the second node may have more resources than the first node, may have resources that may execute the application with higher performance, or may simply be less loaded than the first node.

In either a failover or load-balancing scenario, the state of the application is typically checkpointed. The checkpointed state can be reloaded into the application (e.g. on the second node, when a failover or load balance move occurs) to resume execution with the checkpointed state. In this manner, the state of the application is resilient up to the most recent checkpoint.

Typically, one of two mechanisms are used to checkpoint applications executing on a cluster. In one mechanism (frequently used in cluster server software used to manage the cluster), shared storage that all the nodes can access is provided in the cluster. Checkpoints are written to and read from the shared storage.

Other clusters do not include shared storage (often referred to as "shared nothing" architectures). Such clusters typically implement a second mechanism for checkpointing, in which the applications themselves write checkpoints to another node in the cluster. Thus, the application must be aware of the topology of the cluster (e.g. how many nodes are in the cluster, which nodes have the resources needed to execute the application, etc.). Typically, the application statically selects a node to store the checkpoint data, and thus there is a lack of flexibility in storing the checkpoints. The application must execute on the node that stores the checkpoints as well. The application may be more susceptible to cascading fail-over, when more than one node in the cluster crashes during a short period of time. If both the node executing the application crashes and the node statically selected by the application for the checkpoint storage crashes, then the application becomes unavailable. Additionally, since the application typically executes at the user level, heavy-weight TCP communication is used to communicate the checkpoint data to the statically selected node.

SUMMARY OF THE INVENTION

In one embodiment, a computer accessible medium is encoded with instructions which, when executed: replicate a checkpoint segment from a first local storage of a first node to at least one other node; and load a copy of the checkpoint segment from the other node to a second local storage of a second node. The checkpoint segment is stored into the first local storage by an application, and comprises a state of the application. The copy of the checkpoint segment is loaded into a second local storage responsive to a request from the second node to load the copy. The second node is to execute the application. In some embodiments, the application need not be aware of the replication, when the replication occurs, the nodes to which the checkpoint segment is replicated, etc. A corresponding method is also contemplated.

In some embodiments, a cluster comprises a plurality of nodes. A first node of the plurality of nodes is configured to replicate a checkpoint segment from a first local storage of the first node to at least one other node of the plurality of nodes. The checkpoint segment is stored into the first local storage by an application executing on the first node, and comprises a state of the application. A second node of the plurality of nodes is configured to load a copy of the checkpoint segment from the other node into a second local storage of the second node responsive to a request to load the copy. The second node is to execute the application.

BRIEF DESCRIPTION OF THE DRAWINGS

The following detailed description makes reference to the accompanying drawings, which are now briefly described.

Figure 1:
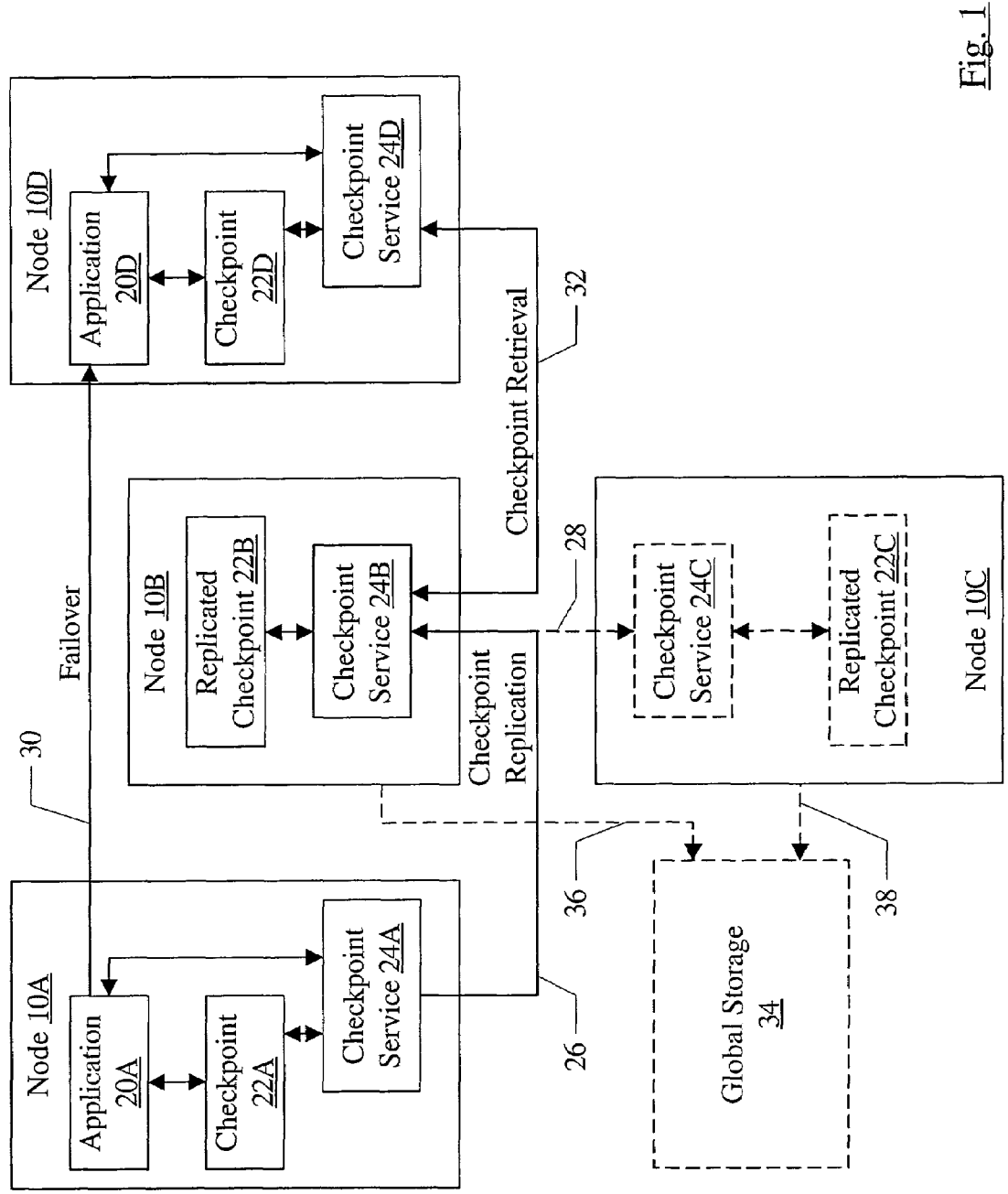
FIG. 1 is a logical diagram of one embodiment of a set of nodes in a cluster, and checkpoint operation among the nodes.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram is shown illustrating a logical view of one embodiment of a cluster of nodes 10A-10D. FIG. 1 illustrates exemplary operation for the failover of an application from the node 10A to the node 10D. In the illustrated embodiment, the node 10A includes an application 20A, a checkpoint segment 22A, and a checkpoint service 24A. The node 10B includes a checkpoint service 24B and a replicated checkpoint segment 22B. The node 10C optionally includes a checkpoint service 24C and a replicated checkpoint segment 22C. The node 10D includes an application 20D, a checkpoint segment 22D, and a checkpoint service 24D. An optional global storage 34 is also illustrated.

Applications may be configured to create checkpoint segments in the local storage of the node on which they are executing. As used herein, the "checkpoint segment" for a given application may comprise the given application's state at a point in time. Enough state is stored such that the application may be restarted, and the state may be reloaded into the program to permit the program to continue execution from the point represented by the checkpoint. For example, if the application is failed over to another node, the checkpoint segment may be used on the other node to recover the application to the point represented by the checkpoint. The application may update the checkpoint segment from time to time as execution continues. For example, the application may update the checkpoint segment after a predetermined period of time has elapsed, or at certain points in execution where checkpointing is deemed desirable (e.g. after completing certain tasks that the application is designed to perform).

The checkpoint services 24A-24D may each comprise a copy of checkpoint service software executed on the corresponding node 10A-10D. The checkpoint services 24A-24D, when executing on a node on which an application is also executing, may provide replication of application checkpoint segments to at least one other node in the cluster. The node(s) storing a replicated checkpoint segment may be referred to as replica node(s) for that checkpoint segment, although the node may be used for many other purposes as well, including executing applications, and may not be a replica node for checkpoint segments of other applications. For example, in FIG. 1, the application 20A is executing on the node 10A, and creates the checkpoint segment 22A. The checkpoint service 24A may replicate the checkpoint segment to the node 10B (replicated checkpoint segment 22B). Optionally, in some embodiments, checkpoint segments may be replicated to more than one node. For example, the checkpoint service 24A may replicate the checkpoint segment 22A to node 10C (replicated checkpoint segment 22C) in addition to the node 10B. Embodiments which replicate the checkpoint segment to more than one node may provide increased resiliency of the application, since a failure in one of the replica nodes may not make the replicated checkpoint segment unavailable if another replica node may provide the replicated checkpoint segment.

The checkpoint services 24A-24D may replicate a checkpoint segment by reading the checkpoint from the local storage of the node 10A-10D on which the corresponding application is executing, and transmitting the checkpoint segment to at least one other node 10A-10D. For example, in FIG. 1, the checkpoint service 24A may read the checkpoint segment 22A from the local storage of the node 10A and may transmit a copy of the checkpoint segment 22A to the node 10B (arrow 26). The checkpoint service 24B in the node 10B receives the copy, and stores the copy in the local storage of the node 10B as the replicated checkpoint segment 22B. Similarly, if replication to the node 10C is also performed, the checkpoint service 24A may transmit the copy of the checkpoint segment 22A to the node 10C (dotted arrow 28). The checkpoint service 24C receives the copy, and stores the copy in the local storage of the node 10C as the replicated checkpoint segment 22C. Still further, in some embodiments, the copy of the checkpoint segment may be written by one or both of the nodes 10B or 10C to the global storage 34 (arrows 36 and 38, respectively) to provide persistency of the checkpoint segment.

As mentioned above, the application 20A may update the checkpoint segment 22A from time to time as the application 20A continues execution on the node 10A. The checkpoint service 24A may replicate the updated checkpoint segments to the other node(s) as well. In some embodiments, the checkpoint service 24A may detect each update to the checkpoint segment 22A, and may replicate the updated checkpoint. For example, the checkpoint service 24A may provide an application programming interface (API) to the application 20A, and the application 20A may inform the checkpoint service 24A of the update using the API. The application 20A may also, in some embodiments, use the API to register the checkpoint segment 22A with the checkpoint service 24A (so that the checkpoint service 24A may locate the checkpoint segment 22A in the local storage 22A). For example, the application 20A may register the checkpoint segment using a checkpoint segment name that is globally unique within the cluster. A globally unique name may not require, e.g., file system support or user intervention. The checkpoint segment name may be used by the application in the APIs, as well as by the checkpoint service 24A-24D. Thus, in such embodiments, the checkpoint segments 22A-22D may each have the same name (the globally unique checkpoint segment name) even though the checkpoint segments have different reference numerals 22A-22D assigned thereto. In other embodiments, the checkpoint service 24A may periodically replicate the checkpoint segment 22A (whether or not an intervening change has occurred).

In some embodiments, the replica nodes (e.g. the nodes 10B and/or 10C, in the embodiment of FIG. 1) may store only a copy of the most recent checkpoint segment. When an updated copy of the checkpoint segment is recited, the replica nodes overwrite the replicated checkpoint segments with the updated copy. In other embodiments, previous copies of the checkpoint segment may also be retained, as desired.

At some point, the application may failover to another node. For example, in FIG. 1, the application 20A may failover to the application 20D on the node 10D (arrow 30). In some embodiments, the application itself may handle the failover. For example, the application 20A and the application 20D may be executing on the respective nodes, with one copy of the application (e.g. the application 20A) actively executing and the other copy of the application (e.g. the application 20D) waiting for a failover request from the active node. The arrow 30 may represent the application 20A transmitting the failover request to the application 20D. In other embodiments, cluster server software may be executing on the nodes 10A-10D (not shown in FIG. 1). The cluster server software may monitor the execution of the application on a given node (e.g. the node 10A), and may failover the application to another node (e.g. the node 10D). In such embodiments, the arrow 30 may represent the cluster server failing over the application. If cluster server software is used, in some embodiments, the cluster server may start the application 20D executing on the node 10D as part of the failover operation. Thus, in such embodiments, the application may not always be running on multiple nodes. In still other embodiments, the checkpoint services 24A-24D may provide primitives for failover (e.g. via the above mentioned API), and the application may use the primitives to accomplish failover. In each case, the application software may be installed on each node (e.g. the nodes 10A and 10D in FIG. 1) so that the application may be executed on that node as desired.

In response to the failover, the application 20D may request a copy of the application's checkpoint segment from the checkpoint service 20D (e.g. using the above described API). The checkpoint service 24D, in response to the request, may load the checkpoint segment into the local storage of the node 10D (e.g. the checkpoint segment 22D in FIG. 1). That checkpoint service 24D may transmit a checkpoint retrieval request to one of the replica nodes for that checkpoint segment (e.g. one of the nodes 10B-10C, in the embodiment of FIG. 1). For example, in FIG. 1, the checkpoint service 24D may transmit the retrieval request to the checkpoint service 24B on the node 10B. The checkpoint service 24B may read the replicated checkpoint segment 22B from the local storage of the node 10B and may transmit the replicated checkpoint segment to the checkpoint service 24D. The checkpoint retrieval request and the corresponding transfer of the checkpoint segment is represented in FIG. 1 by the arrow 32. The checkpoint service 24D loads the replicated checkpoint segment into the local storage of the node 10D as the checkpoint segment 22D. The application 20D may recover to the checkpoint using the checkpoint segment 22D.

As the embodiment of FIG. 1 illustrates, the application may be failed over without requiring shared storage in the cluster. Additionally, in some embodiments, the application may rapidly update the checkpoint segment or restore state from the checkpoint segment because the checkpoint segment is stored in local storage. Thus, application performance may be less impacted by checkpointing, in some cases, that if the application handled checkpointing to shared storage or to another node. After updating the local storage with the checkpoint state, the application may continue execution while the checkpoint service handles replicating the checkpoint segment. Additionally, the checkpoint service may insulate the application from details of the checkpoint segment replication (e.g. which nodes are used to store replicated checkpoint segments, when replication occurs, etc.). The application need not be aware, for example, of the topology of the cluster (e.g. the number of nodes, the resources available on each node, etc.). The checkpoint service may retain flexibility to select which nodes serve as replica nodes for the application's checkpoint segment, how many nodes serve as the replica nodes, etc. If the nodes in the cluster are changed (e.g. nodes are added to the cluster or deleted from the cluster), the checkpoint service may modify the selection of replica nodes. The application need not handle the replication. Instead, the application may simply create a checkpoint segment in the local storage of the node on which it executes and update the checkpoint segment with the application state as desired.

In some embodiments, one or more of the replica nodes may not be capable of executing the application. For example, the replica nodes may not include one or more hardware or software resources required by the application for the application to execute. However, with the checkpoint service handling the replication, the replica nodes may serve to store the replicated checkpoint segments (e.g. as long as the replica nodes are capable of executing the checkpoint service software).

Figure 2:
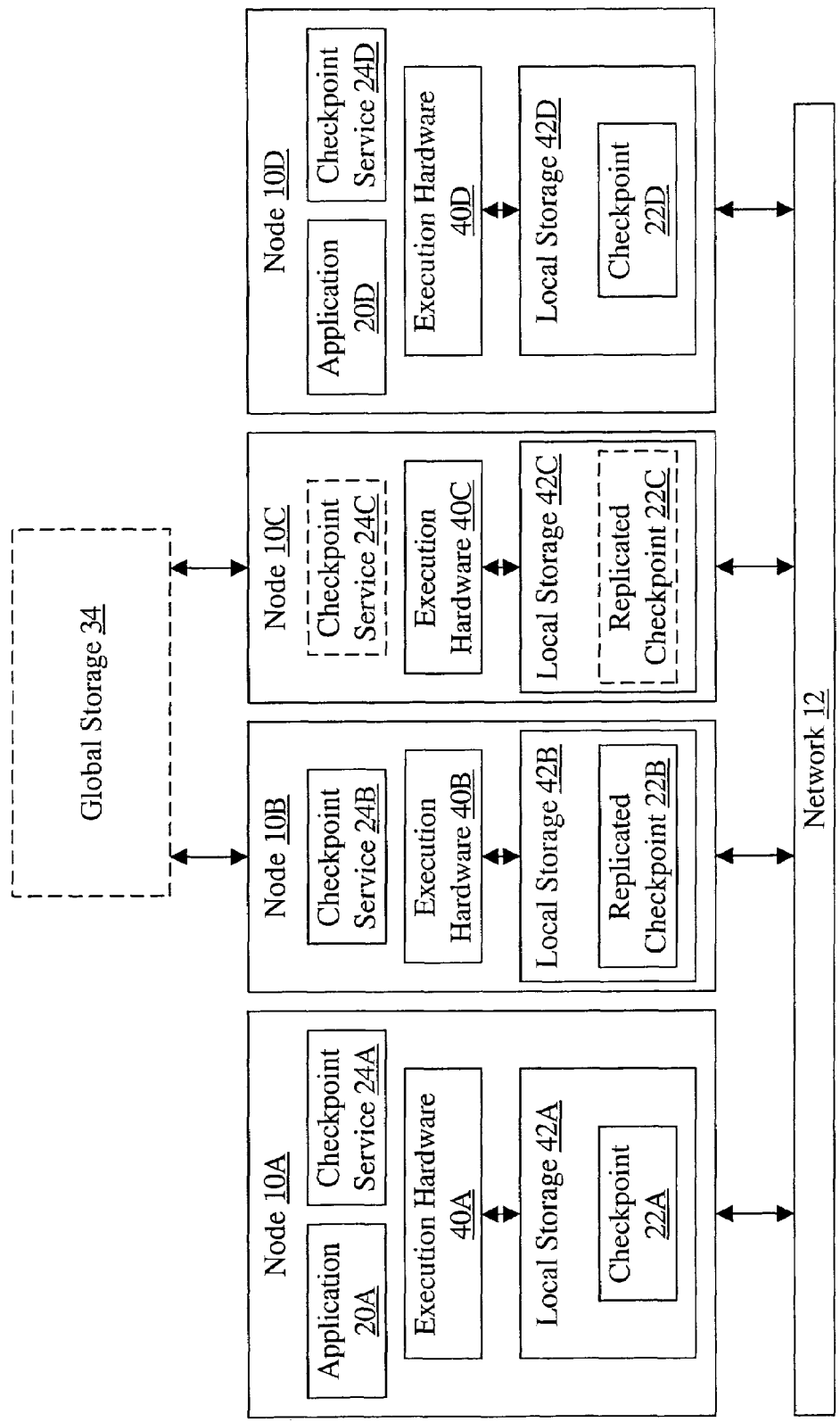
FIG. 2 is a physical diagram of one embodiment of a set of nodes in a cluster.

It is noted that, while four nodes 10A-10D are illustrated in FIGS. 1 and 2, any number of nodes may be included in various embodiments. It is further noted that various nodes may execute any number of applications, as desired. Additionally, while the checkpoint service is described as being implemented in software, other embodiments may implement the checkpoint service in hardware, or in a combination of hardware and software, as desired.

Turning now to FIG. 2, a block diagram is shown illustrating a physical view of one embodiment of the cluster of nodes 10A-10D. Each "node" may comprise a computer system. In the embodiment of FIG. 2, the nodes 10A-10D are coupled to a network 12 for communication between the nodes 10A-10D. Each of the nodes 10A-10D may include respective execution hardware 40A-40D, which may be used to execute the software in that node. For example, the execution hardware 40A-40D may execute the checkpoint service 24A-24D on each node, respectively. The execution hardware 40A may also execute the application 20A, and the execution hardware 40D may similarly also execute the application 20D. The execution hardware 40A-40D may be coupled to the local storage 42A-42D, respectively, of each node 10A-10D. The local storage 42A-42D may store various checkpoint segments 22A-22D as shown in FIG. 2. In some embodiments, the optional global storage 34 may be coupled to the nodes 10B-10C.

As mentioned above, the execution hardware 40A-40D may generally comprise hardware used to execute various software on the nodes 10A-10D. For example, the execution hardware may include one or more processors designed to execute the instructions that comprise the software (e.g. the applications 20A and 20D and the checkpoint services 24A-24D, as well as operating system software (not shown in FIG. 2)). The execution hardware may further include various circuitry for interfacing with the local storage in the same node and for interfacing to the network 12.

As used herein, "local storage" refers to any storage which may be included in a node or attached to a node, to which only that node has direct access. Other nodes may communicate with that node to request data from the node, in some cases (e.g. via the network 12), but may not directly access the local storage to access the data. Local storage may include volatile storage and/or nonvolatile storage. Volatile storage may include, for example, random access memory (RAM) such as static RAM (SRAM) or dynamic RAM (DRAM). DRAM may include various types such as asynchronous DRAM, synchronous DRAM (SDRAM), double data rate SDRAM (DDR SDRAM), RAMBUS DRAM (RDRAM), etc. Nonvolatile storage may include various types of peripheral devices such as disk drives (e.g. fixed or removable disks) or solid state storage such as battery-backed SRAM or FLASH memory.

The execution hardware 40A-40D may be coupled to the local storage 42A-42D in the same node 10A-10D in various fashions. For example, if the local storage includes the main memory system of the node (populated with RAM), the execution hardware may be coupled to a memory controller (or may include a memory controller) that controls access to the main memory system. If the local storage includes peripheral devices, the execution hardware may be coupled to the local storage using various peripheral connections such a peripheral component interconnect (PCI), Fibre Channel, small computer systems interface (SCSI), universal serial bus (USB), firewire, etc.

In one embodiment, the checkpoint segments 22A-22D may be stored in high speed volatile storage within the local storage 42A-42D (e.g. in the main memory system) to permit high speed access to the checkpoint segments by the corresponding applications. In other embodiments, the checkpoint segments 22A-22D may be stored in nonvolatile storage (e.g. disk storage).

The network 12 may comprise any network technology in various embodiments. The network 12 may be a local area network, wide area network, intranet network, Internet network, wireless network, or any other type of network or combinations of the above networks. The network 12 may be designed to be continuously available (although network outages may occur), or may be intermittent (e.g. a modem connection made between a computer system in a user's home and a computer system in a user's workplace). Any network media may be used. For example, the network 12 may be an Ethernet network. Alternatively, the network may be a token ring network, etc. Generally, the checkpoint services 24A-24D may communicate using the network 12 (e.g. copies of checkpoint segments may be transmitted over the network 12, retrieval requests may be transmitted over the network 12, etc.). In other embodiments, the network 12 may comprise a cache-coherent, non-uniform memory access (CC-NUMA) memory bus.

In some embodiments, the nodes 10A-10D may be blades in a blade server. Generally, a blade server comprises an enclosure into which multiple blades may be inserted to form the server. Each blade may comprise a computer system. In some such embodiments, the network 12 may comprise the back plane into which the blades are inserted.

The global storage 34 may be any type of non-volatile storage that may be accessible to one or more of the nodes 10A-10D. The global storage 34 may be accessible to each of the nodes 10A-10D, or a subset of the nodes 10A-10D, as desired. The global storage 34 may be coupled to the nodes separate from the network 12, or through the network 12, as desired in various embodiments.

Turning next to FIGS. 3-7, flowcharts are shown illustrating operation of one embodiment of the checkpoint service in response to various events. The checkpoint service may comprise instructions which, when executed, implement the functionality shown in each of the flowcharts.

Figures 3, 4, 5:
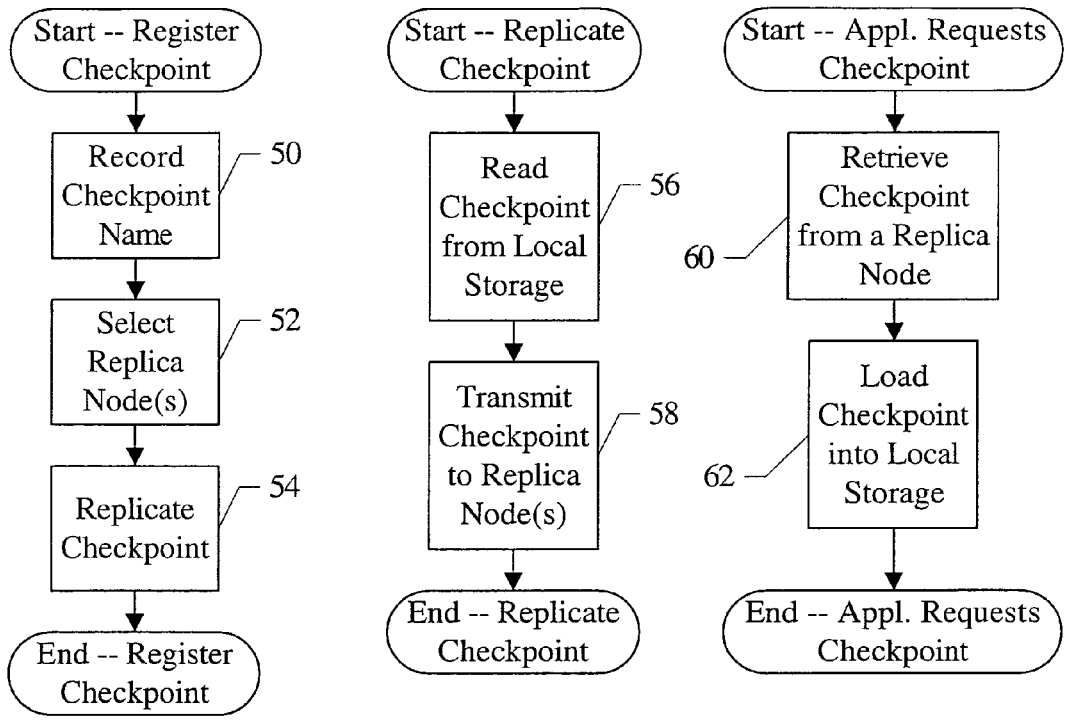
FIG. 3 is a flowchart illustrating operation of one embodiment of a checkpoint service in response to registering a checkpoint segment of an application.
FIG. 4 is a flowchart illustrating operation of one embodiment of a checkpoint service to replicate a checkpoint segment.
FIG. 5 is a flowchart illustrating operation of one embodiment of a checkpoint service in response to in response to a request from an application for a checkpoint segment.

FIG. 3 illustrates operation of one embodiment of the checkpoint service in response to receiving a request from an application to register a checkpoint segment with the checkpoint service. For example, in FIG. 1, the application 20A may register its checkpoint segment 22A with the checkpoint service 24A.

The checkpoint service may record the checkpoint name, or some other indication of the checkpoint segment, so that that checkpoint service may locate the checkpoint segment in the local storage (block 50). For example, if the checkpoint segment is stored in the main memory system of the node, the address of the checkpoint segment may be recorded. Alternatively, a symbolic name that corresponds to the address may be recorded. If the checkpoint segment is stored on disk, the checkpoint name may be the file name of the checkpoint segment file. Additionally, the checkpoint service may select the replica node or nodes to store the replicated checkpoint segment (block 52). Alternatively, replica node selection may be performed at other times. The checkpoint service may also replicate the checkpoint segment (block 54).

Turning now to FIG. 4, a flowchart is shown illustrating operation of one embodiment of the checkpoint service for replicating the checkpoint segment. For example, in FIG. 1, the checkpoint service 24A may perform the flowchart of FIG. 4 to replicate the checkpoint segment 22A to the replicated checkpoint segments 22B-22C. The flowchart of FIG. 4 may be illustrative of block 54 in FIG. 3. Additionally, the flowchart of FIG. 4 may illustrate operation at various other points in time (e.g. after each update of the checkpoint segment by the corresponding application, or a periodic replication, in various embodiments). The checkpoint service may read the checkpoint segment from the local storage (block 56), and may transmit the checkpoint segment contents to the replica node or nodes (block 58).

FIG. 5 illustrates operation of one embodiment of the checkpoint service in response to receiving a request from the application for the checkpoint segment. For example, in FIG. 1, the checkpoint service 24D may perform the flowchart of FIG. 5 in response to the application 20D requesting the checkpoint segment due to the failover of the application to the node 10D. The checkpoint service 24D may retrieve a copy of the checkpoint segment from one of the replica nodes (block 60), and may load the copy of the checkpoint segment into the local storage (block 62).

It is noted that, in some embodiments, a cluster server may be used to failover an application. In such embodiments, a part of the cluster server software may make the request for the checkpoint segment. For example, the embodiment of FIG. 9 will be discussed in more detail below. In that embodiment, an agent corresponding to the application is part of the cluster server software. The agent may request the checkpoint segment as part of restart the application on a node.

Figures 6, 7:
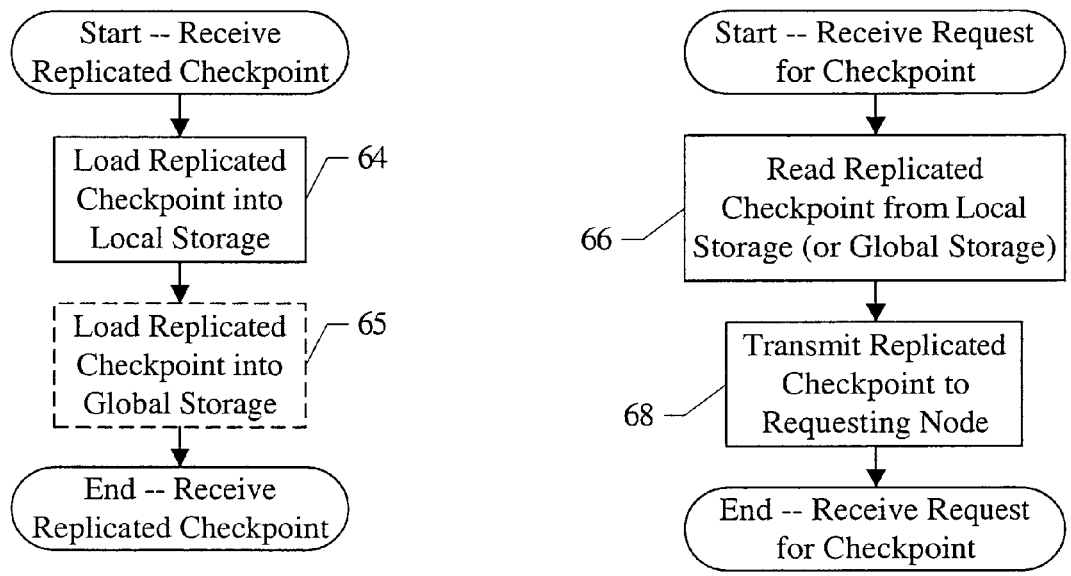
FIG. 6 is a flowchart illustrating operation of one embodiment of a checkpoint service in response to receiving a checkpoint on a replica node.
FIG. 7 is a flowchart illustrating operation of one embodiment of a checkpoint service in response to receive a request for a copy of a checkpoint on a replica node.

FIG. 6 illustrates operation of one embodiment of the checkpoint service in response to receiving a replicated checkpoint segment from another node. For example, in FIG. 1, the checkpoint services 24B-24C may perform the flowchart of FIG. 6 in response to receiving the replicated checkpoint segment from the node 10A. The checkpoint service may load the replicated checkpoint segment into the local storage on the node (block 64). Optionally, the checkpoint service may also load the replicated checkpoint segment into the global storage 34 (block 65).

FIG. 7 illustrates operation of one embodiment of the checkpoint service in response to receiving a retrieval request for a replicated checkpoint segment from another node. For example, in FIG. 1, the checkpoint services 24B-24C may perform the flowchart of FIG. 7 in response to receiving the retrieval request from the node 10D. The checkpoint service may read the replicated checkpoint segment from the local storage (or optionally from the global storage 34, in some embodiments) (block 66) and may transmit the replicated checkpoint segment to the requesting node (block 68).

Figure 8:
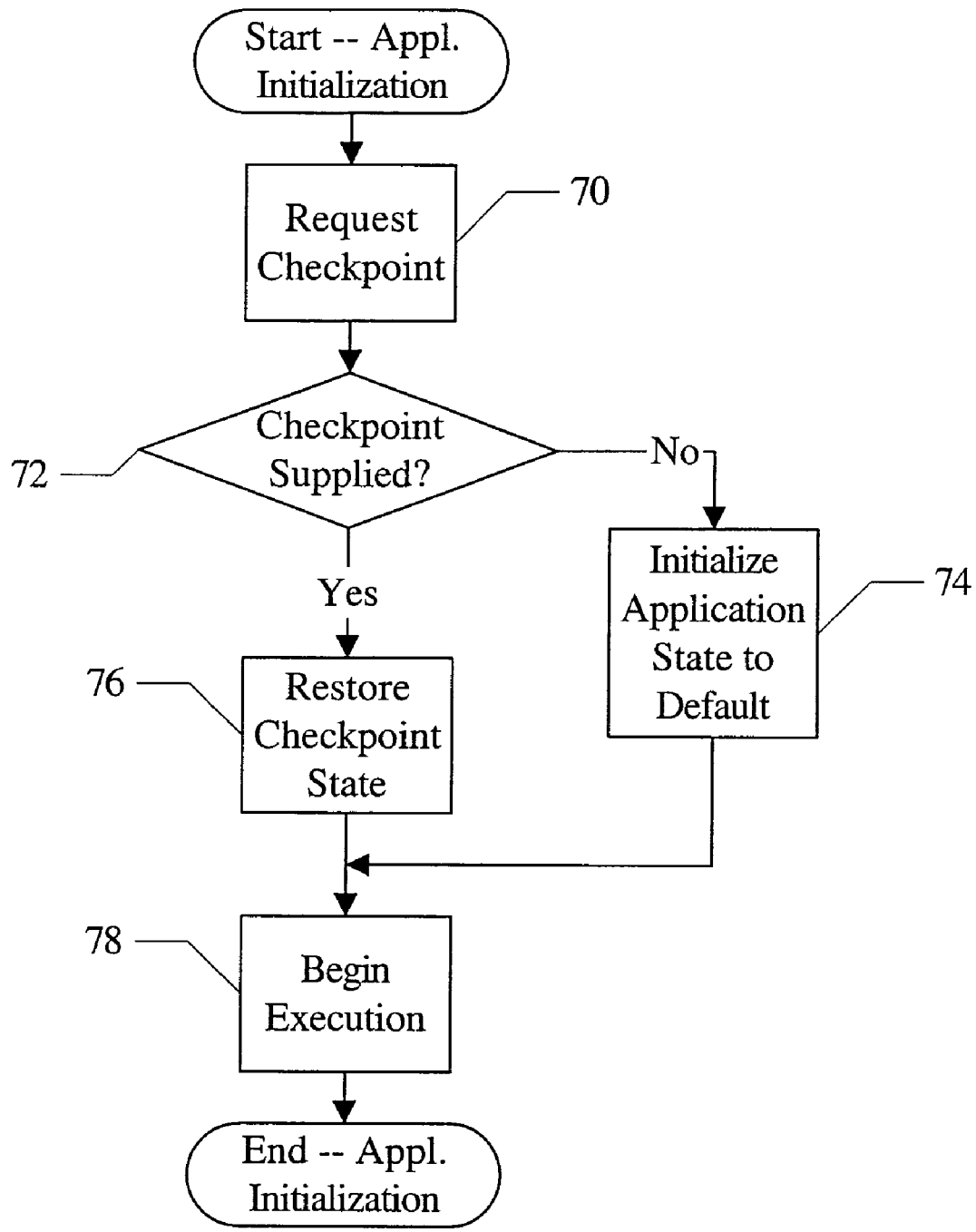
FIG. 8 is a flowchart illustrating operation of one embodiment of an application during initialization of the application.

Turning next to FIG. 8, a flowchart is shown illustrating high level operation of one embodiment of an exemplary application during initialization (e.g. when the application is beginning execution). The exemplary application may comprise instructions which, when executed, implement the functionality shown in FIG. 8.

The application may request a checkpoint segment from the checkpoint service (e.g. using the checkpoint segment name through the API) (block 70). The application may then determine if the checkpoint segment has been supplied by the checkpoint service (decision block 72). There may be various reasons why the checkpoint segment is not supplied by the checkpoint service. For example, there may not be a checkpoint segment (e.g. if the application is executing for the first time, or if the application exited execution normally in a previous execution and the checkpoint segments were deleted). Alternatively, each of the replica nodes may be down at the time of the request, and thus the application's checkpoint segment may not be available to be transferred to the node that is executing the application.

If the checkpoint segment is not supplied (decision block 72—"no" leg), the application may initialize its state to a default to begin execution (block 74). If the checkpoint segment is supplied (decision block 72—"yes" leg), the application restores its state to the checkpoint state (block 76). In either case, the application may then begin normal execution (block 78). Normal execution may include creating the checkpoint segment (if necessary) and updating the checkpoint segment.

Figure 9:
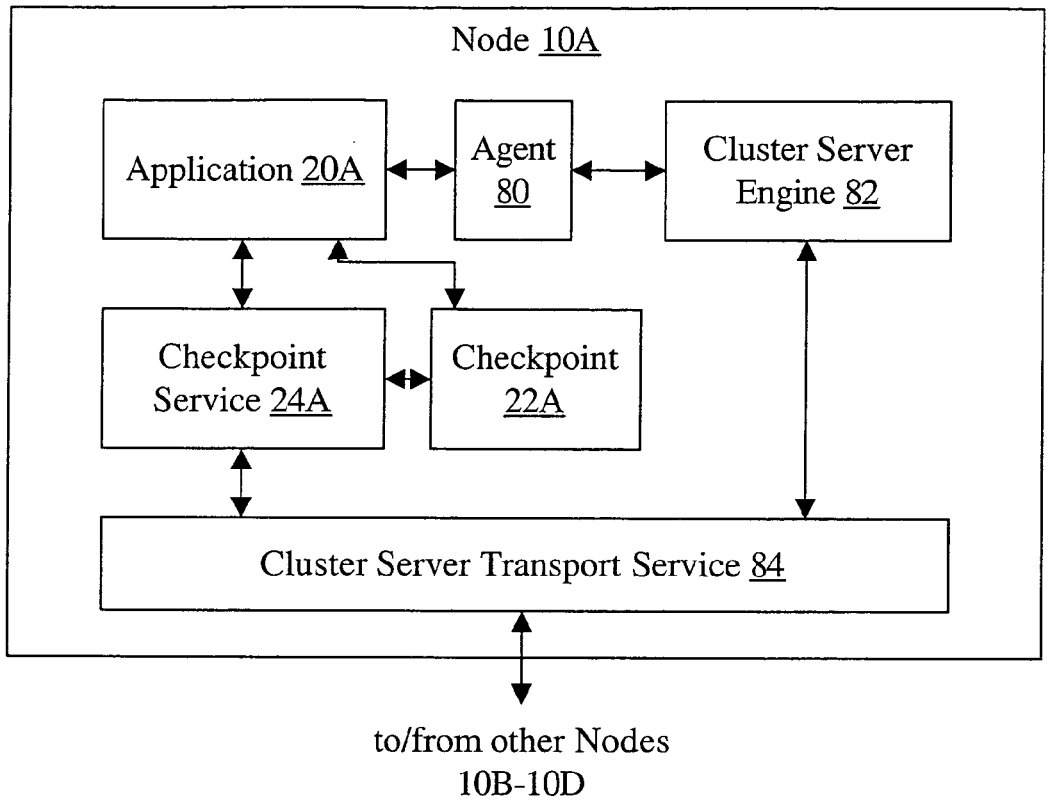
FIG. 9 is a block diagram of additional details of one embodiment of a node.

Turning now to FIG. 9, a block diagram illustrating another embodiment of the node 10A is shown. Other nodes 10B-10D may be similar. In the embodiment of FIG. 9, the node 10A includes the application 20A, the checkpoint segment 22A, and the checkpoint service 24A. Additionally, the node 10A includes an agent 80, a cluster server engine 82, and a cluster server transport service 84. The agent 80, the cluster server engine 82, and the cluster server transport service 84 may together form a cluster server.

The cluster server transport service 84 may be generally responsible for communications between the cluster server engine 82 and cluster server engines on other nodes 10B-10D (using, e.g., the network 12 to communicate). The cluster server transport service 84 may be a lighter-weight transport protocol than TCP, for example (i.e. requiring less overhead to communicate, and thus permitting communication at higher performance). In this embodiment, the checkpoint service 24A may also use the cluster server transport service 84 to communicate with other checkpoint services 24B-24D on other nodes 10B-10D. In other embodiments in which the network 12 comprises a CC-NUMA interconnect, CC-NUMA memory references may be the transport mechanism used to communicate between the nodes 10A-10D.

The cluster server engine 82 may provide the application failover service (in conjunction with the agent 80) as well as provide other cluster management functions. The agent 80, which may be designed specifically for the application 20A, monitors the operation of application 20A and also brings the application online and offline. In some embodiments, the agent 80 may also request that the checkpoint segment be copied to the node as part of bringing the application online. In one implementation, the cluster server may be the VERITAS Cluster Server™ product available from VERITAS Software Corporation (Mountain View, Calif.).

The cluster server software may monitor a given application and various resources (a "service group") for the given application. In other cases, multiple applications and corresponding resources may be grouped together as a service group. The cluster server software may fail over an application if one of the resources are detected as failing. Resources may include software (e.g. applications, operating system software components, operating system services, etc.) and/or hardware (e.g. disk drives, network interface circuitry, etc.).

Figure 10:
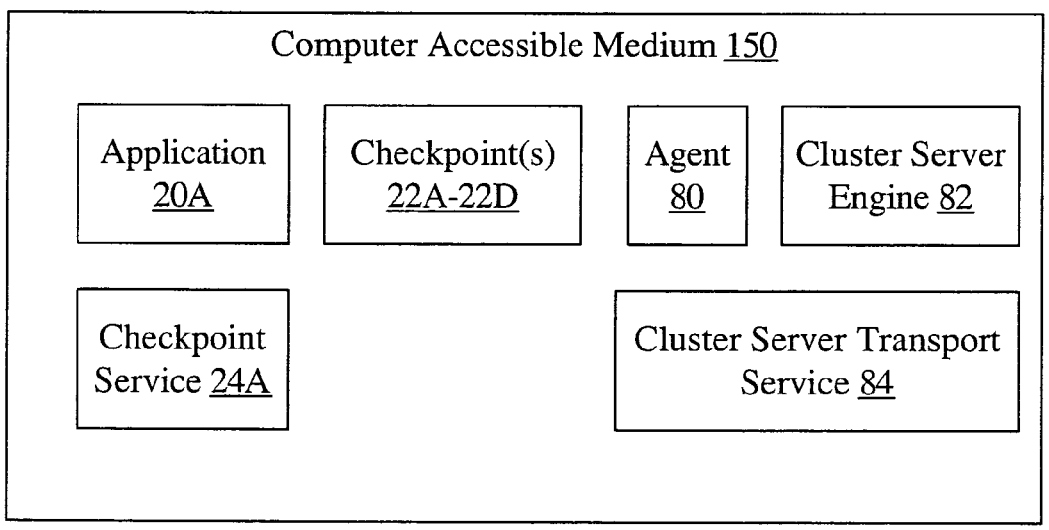
FIG. 10 is a block diagram of one embodiment of a computer accessible medium.

Turning now to FIG. 10, a block diagram of a computer accessible medium 150 is shown. Generally speaking, a computer accessible medium may include any media accessible by a computer during use to provide instructions and/or data to the computer. For example, a computer accessible medium may include storage media such as magnetic or optical media, e.g., disk (fixed or removable), CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link. The computer accessible medium 150 in FIG. 10 may be encoded with one or more of the application 20A, the checkpoint service 24A, the checkpoints 22A-22D, the agent 80, the cluster server engine 82, and the cluster server transport service 84. Generally, the computer accessible medium 150 may store any set of instructions which, when executed, implement a portion or all of the flowcharts shown in one or more of FIGS. 3-8. In some embodiments, the computer accessible medium 150 may comprise one or more of global storage accessible to the nodes 10A-10D, storage included in the nodes 10A-10D, storage on removable media accessible to the nodes 10A-10D (at least temporarily), or any combination thereof.

It is noted that, while various aspects of the above embodiment have been described as being implemented in software (e.g. the checkpoint services 24A-24D), other embodiments may implement the aspects partially in software and partially in hardware in the nodes, or wholly in hardware in the nodes, as desired.

Numerous variations and modifications will become apparent to those skilled in the art once the above disclosure is fully appreciated. It is intended that the following claims be interpreted to embrace all such variations and modifications.

What is claimed is:

1. A computer accessible storage medium encoded with instructions forming a checkpoint service, wherein the instructions, when executed:
   receive a request to register a checkpoint segment from an application that is separate from the checkpoint service;
   replicate the checkpoint segment from a first local storage of a first node to at least one other node responsive to the application registering the checkpoint segment with the checkpoint service, wherein the checkpoint segment is stored into the first local storage by the application, and wherein the checkpoint segment comprises a state of the application, and wherein the first local storage is directly accessible only to the first node; and
   load a copy of the replicated checkpoint segment from the at least one other node into a second local storage of a second node responsive to a request from the second node to load the copy, wherein the second node is to execute the application, wherein the checkpoint segment is identified by a checkpoint segment name that is unique within a cluster including the first node and the second node.

2. The computer accessible storage medium as recited in claim 1 wherein the at least one other node comprises two or more other nodes.

3. The computer accessible storage medium as recited in claim 1 wherein the request to load the copy is issued by the application executing on the second node.

4. The computer accessible storage medium as recited in claim 1 wherein the request to load the copy is issued by an agent that monitors the application on behalf of a cluster server.

5. The computer accessible storage medium as recited in claim 1 wherein the instructions, when executed, retrieve the copy from one of the at least one other node responsive to the request.

6. The computer accessible storage medium as recited in claim 1 wherein the at least one other node is configured to load the copy into a global storage, and wherein the instructions, when executed, retrieve the copy from the global storage responsive to the request.

7. The computer accessible storage medium as recited in claim 1 wherein the instructions, when executed, replicate the checkpoint segment by performing at least:
   reading the checkpoint segment from the first local storage of the first node; and
   transmitting the checkpoint segment to the at least one other node.

8. The computer accessible storage medium as recited in claim 1 wherein the instructions, when executed:
   receive a retrieval request in the at least one other node; and
   transmit the copy to a source of the retrieval request.

9. The computer accessible storage medium as recited in claim 1 wherein the instructions, when executed:
   receive the checkpoint segment from the first node in the at least one other node; and
   store the checkpoint segment in the at least one other node.

10. The computer accessible storage medium as recited in claim 1 wherein the at least one other node is configured to load the copy into a global storage, and wherein the instructions, when executed:
receive the checkpoint segment from the first node; and
store the checkpoint segment in the global storage.

11. The computer accessible storage medium as recited in claim 1 wherein the at least one other node is not capable of executing the application.

12. A method comprising:
an application storing a checkpoint segment of the application's state to a local storage of a first node on which the application is executing, wherein the local storage is directly accessible only to the first node;
the application registering the checkpoint segment with a checkpoint service that is separate from the application;
the checkpoint service replicating a checkpoint segment from the first local storage of the first node to at least one other node responsive to the registering and the storing; and
loading a copy of the replicated checkpoint segment from the at least one other node into a second local storage of a second node responsive to a request from the second node to load the copy, wherein the second node is to execute the application, wherein the checkpoint segment is identified by a checkpoint segment name that is unique within a cluster including the first node and the second node.

13. The method as recited in claim 12 wherein the at least one other node comprises two or more other nodes.

14. The method as recited in claim 12 further comprising issuing the request to load the copy by the application executing on the second node.

15. The method as recited in claim 12 further comprising issuing the request to load the copy by an agent that monitors the application on behalf of a cluster server.

16. The method as recited in claim 12 further comprising retrieving the copy from one of the at least one other node responsive to the request.

17. The method as recited in claim 12 wherein the at least one other node is configured to load the copy into a global storage, the method further comprising retrieving the copy from the global storage responsive to the request.

18. The method as recited in claim 12 wherein replicating the checkpoint segment comprises:
reading the checkpoint segment from the first local storage of the first node; and
transmitting the checkpoint segment to the at least one other node.

19. The method as recited in claim 12 further comprising:
receiving a retrieval request in the at least one other node; and
transmitting the copy to a source of the retrieval request.

20. The method as recited in claim 12 further comprising:
receiving the checkpoint segment from the first node in the at least one other node; and
storing the checkpoint segment in the at least one other node.

21. The method as recited in claim 12 further comprising:
receiving the checkpoint segment from the first node; and
storing the checkpoint segment in a global storage.

22. The method as recited in claim 12 wherein the at least one other node is not capable of executing the application.

23. A cluster comprising a plurality of nodes, wherein each of the plurality of nodes comprises a computer, and
wherein a checkpoint service executing on a first node of the plurality of nodes is configured to replicate a checkpoint segment from a first local storage of the first node to at least one other node of the plurality of nodes,
wherein the checkpoint segment is stored into the first local storage by an application executing on the first node separate from the checkpoint service, and
wherein the application is configured to register the checkpoint segment with the checkpoint service and wherein the checkpoint service is configured to replicate the checkpoint segment responsive to the application registering the checkpoint segment and storing the checkpoint segment to the local storage, wherein the local storage is directly accessible only to the first node of the plurality of nodes, and
wherein the checkpoint segment comprises a state of the application, and
wherein a checkpoint service executing on a second node of the plurality of nodes is configured to load a copy of the replicated checkpoint segment from the at least one other node into a second local storage of the second node responsive to a request to load the copy, wherein the second node is to execute the application, wherein the checkpoint segment is identified by a checkpoint segment name that is unique within a cluster including the first node and the second node.

24. The cluster as recited in claim 23 wherein the at least one other node is not capable of executing the application.

25. The computer accessible storage medium as recited in claim 1 wherein the instructions, when executed:
record the checkpoint segment name to access the checkpoint segment for replicating.

26. The computer accessible storage medium as recited in claim 25 wherein the instructions, when executed:
select the at least one other node to which the checkpoint segment is to be replicated responsive to the request to register the checkpoint segment.

27. The method as recited in claim 12 further comprising:
recording the checkpoint segment name to access the checkpoint segment for replicating responsive to the registering.

28. The method as recited in claim 27 further comprising:
selecting the at least one other node to which the checkpoint segment is to be replicated responsive to the registering.

\* \* \* \* \*